(12) United States Patent
Stowell et al.

(10) Patent No.: US 10,773,639 B1
(45) Date of Patent: *Sep. 15, 2020

(54) TAILGATE LED (LIGHT EMITTING DIODE) CAP SYSTEM, DEVICE, AND METHOD

(71) Applicant: Martin L. Stowell, Valencia, CA (US)

(72) Inventors: Martin L. Stowell, Valencia, CA (US); Mark Santus, Daytona Beach, FL (US)

(73) Assignee: Martin L. Stowell, Valencia, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/273,818

(22) Filed: Feb. 12, 2019

Related U.S. Application Data

(62) Division of application No. 15/727,080, filed on Oct. 6, 2017, now Pat. No. 10,246,006.

(51) Int. Cl.

| | |
|---|---|
| *B60Q 1/00* | (2006.01) |
| *B60Q 3/00* | (2017.01) |
| *B60Q 1/26* | (2006.01) |
| *F21S 43/14* | (2018.01) |
| *B60Q 1/30* | (2006.01) |
| *F21V 19/00* | (2006.01) |
| *F21Y 103/00* | (2016.01) |

(52) U.S. Cl.
CPC ......... *B60Q 1/2615* (2013.01); *B60Q 1/2692* (2013.01); *B60Q 1/30* (2013.01); *F21S 43/14* (2018.01); *F21V 19/0055* (2013.01); *F21Y 2103/00* (2013.01)

(58) Field of Classification Search
USPC ........................................................ 362/485
See application file for complete search history.

(56) References Cited

U.S. PATENT DOCUMENTS

| | | |
|---|---|---|
| 1,431,139 A | 10/1922 | Norton |
| 3,496,742 A | 2/1970 | Rothweiler et al. |
| 3,691,366 A | 9/1972 | Spreuer |
| 4,584,856 A | 4/1986 | Petersdorff et al. |
| 5,709,367 A | 1/1998 | Heintz et al. |
| 6,799,873 B2 | 10/2004 | Fox |
| 7,057,885 B2 | 6/2006 | Shih-Tsung |
| 7,455,436 B2 | 11/2008 | Rowland et al. |
| 7,834,750 B1 | 11/2010 | Hertz et al. |
| 7,954,783 B2 | 6/2011 | Vigil |
| 8,237,557 B1 | 8/2012 | Hertz et al. |
| 8,714,792 B2 | 5/2014 | Adams |
| 8,833,986 B2 | 9/2014 | MacGregor |
| 9,205,774 B2 | 12/2015 | Kennemer et al. |
| 9,540,866 B2 | 1/2017 | Yi |
| 9,649,969 B1 | 5/2017 | Leurck et al. |
| 9,651,193 B1 | 5/2017 | Taberner |
| 2003/0039126 A1 | 2/2003 | Fox |
| 2005/0146888 A1 | 7/2005 | Metcalf |
| 2008/0310179 A1 | 12/2008 | Bates |
| 2009/0224505 A1 | 9/2009 | Peterson et al. |
| 2010/0171606 A1 | 7/2010 | Law et al. |

(Continued)

*Primary Examiner* — Tuyen K Vo
(74) *Attorney, Agent, or Firm* — Brian S. Steinberger; Hilary F. Steinberger; Law Offices of Brian S. Steinberger, P.A.

(57) ABSTRACT

Systems, devices, and methods for a tailgate LED (light emitting diode) cap system, device and method, for attaching LED caps on top of truck tailgates as a safe and secure after-market or retrofit product. The LED cap can be easily attached to the tops of truck tailgates with fasteners but are not removable without unlocking locks covering the fasteners.

19 Claims, 20 Drawing Sheets

(56) References Cited

U.S. PATENT DOCUMENTS

| | | |
|---|---|---|
| 2010/0186465 A1 | 7/2010 | Frantz |
| 2011/0090072 A1 | 4/2011 | Haldeman |
| 2014/0192545 A1 | 7/2014 | Law et al. |
| 2014/0198510 A1 | 7/2014 | Law et al. |
| 2015/0217685 A1 | 8/2015 | Salter et al. |
| 2016/0178146 A1 | 6/2016 | Oleske et al. |
| 2017/0184271 A1 | 6/2017 | Norris et al. |
| 2018/0119915 A1 | 5/2018 | Elwell et al. |

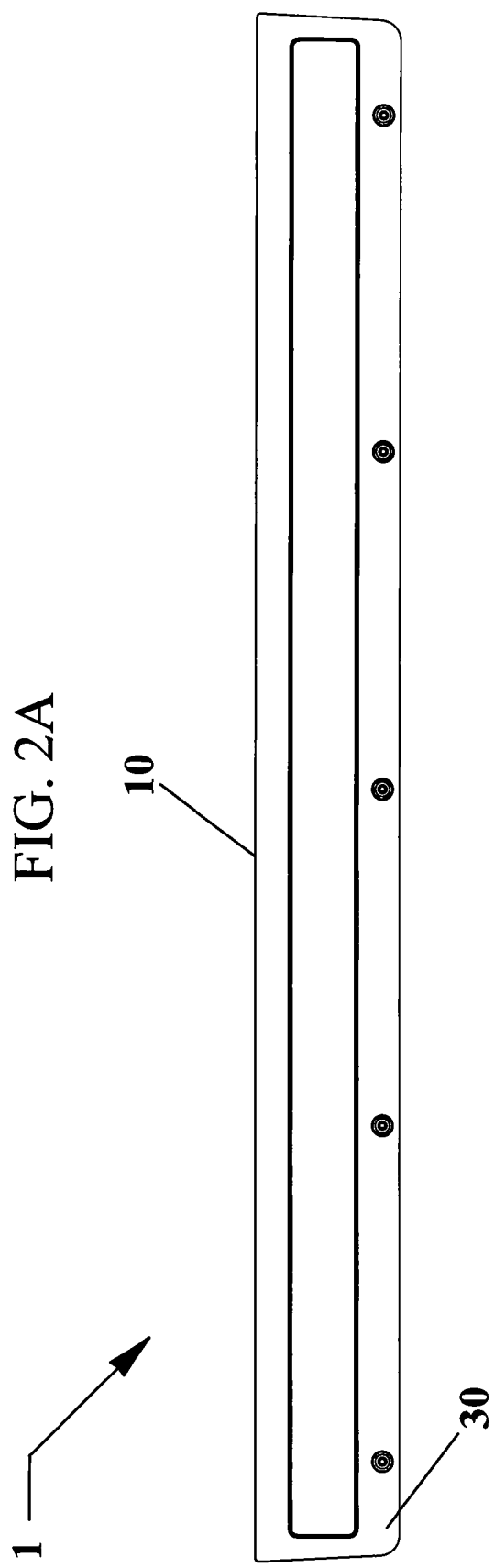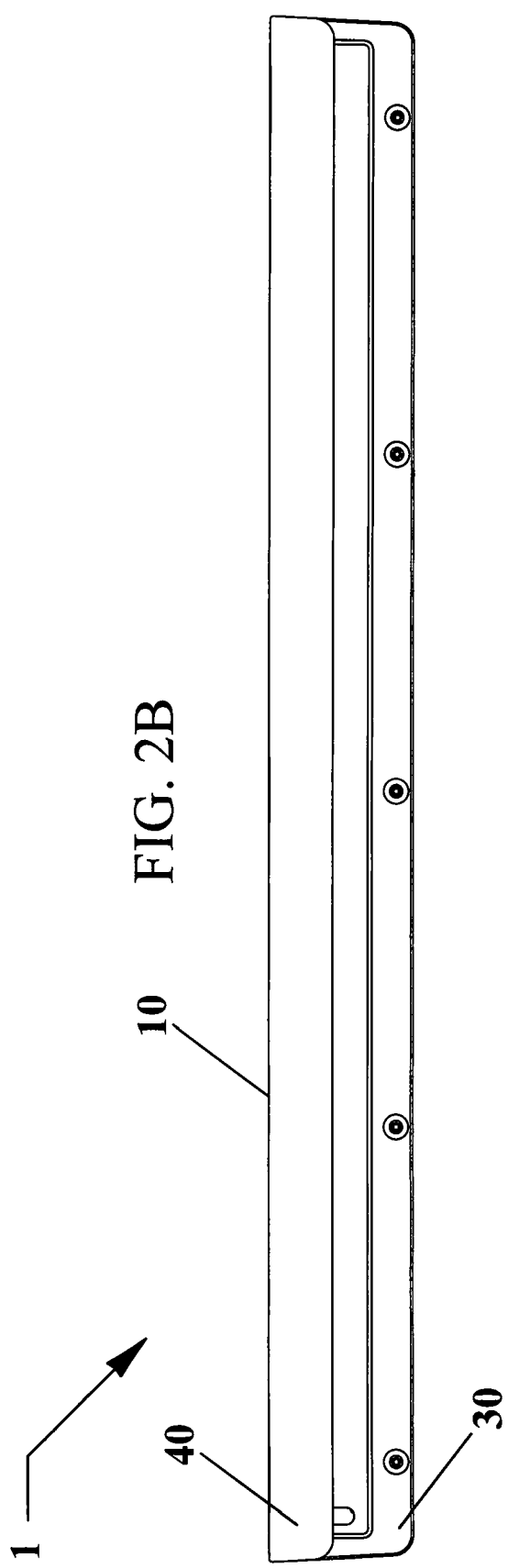

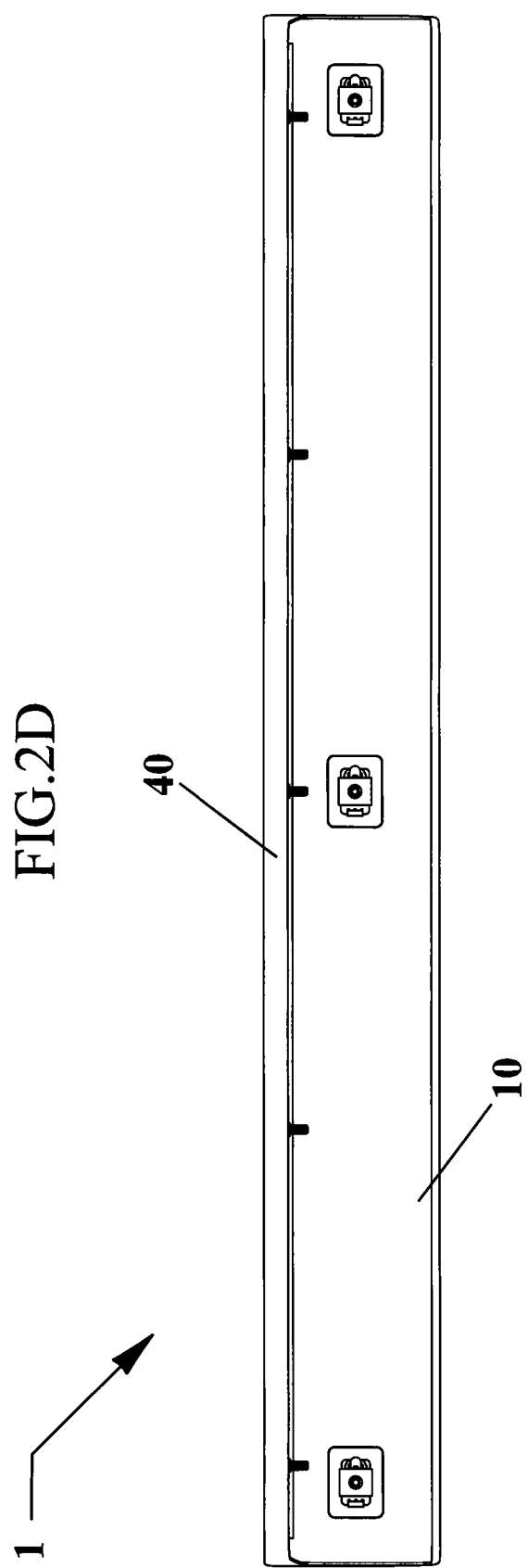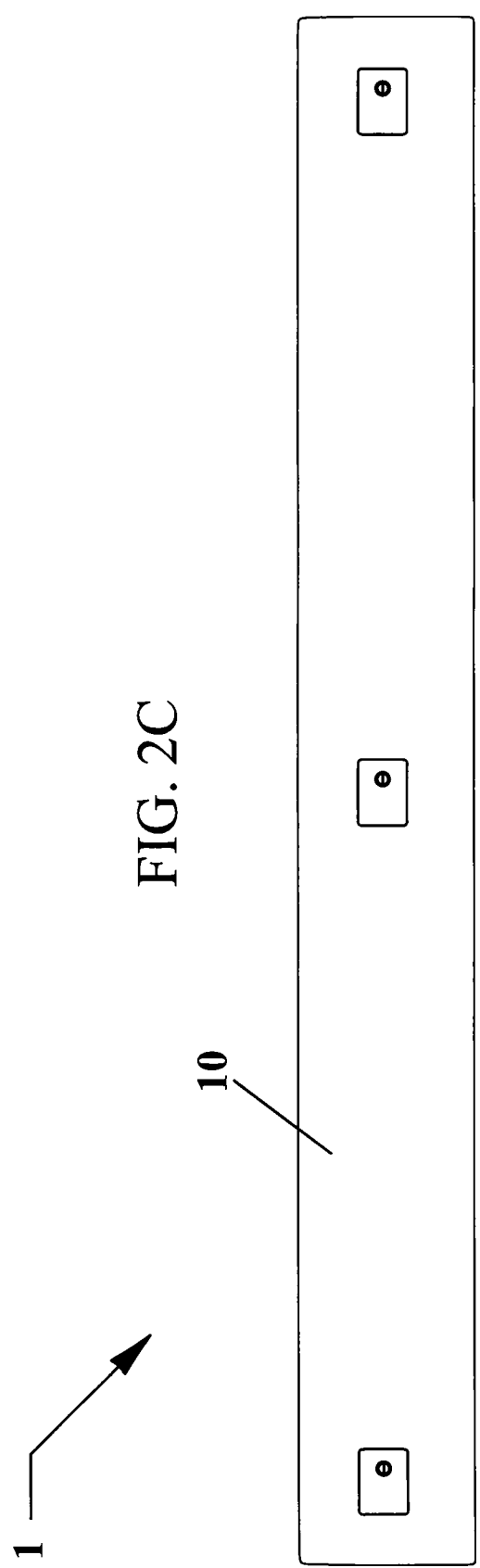

TAILGATE LED (LIGHT EMITTING DIODE) CAP SYSTEM, DEVICE, AND METHOD

RELATED APPLICATIONS

This application is a Divisional Patent Application of U.S. patent application Ser. No. 15/727,080 filed Oct. 6, 2017, now U.S. Pat. No. 10,246,006, which is incorporated by reference in its' entirety.

FIELD OF INVENTION

This invention relates to truck tailgates lights, and in particular to systems, devices, and methods for a tailgate LED (light emitting diode) cap system, device and method, for attaching on top of truck tailgates as an after-market or retrofit product which can be easily attached to tailgates with fasteners but not easily removed without unlocking locks covering the fasteners.

BACKGROUND AND PRIOR ART

Trucks having fold down tailgates are often used on construction sites to deliver and retrieve supplies and materials, and when stopped often turn off their front and rear lights and brake lights. A problem occurs that the trucks are not easily visible when stopped when their lights are turned off during these stops. As such, it can be dangerous to others when these trucks are stopped since their visibility can be severely limited, especially in dark locations or during storms, and the like.

Leaving on the truck vehicle's lights on may not be enough to bring attention to the stopped trucks. As such, there is a need to have extra lights for bringing attention to a stopped truck vehicle to increase the visibility of the stopped vehicle as well as for safety reasons.

Additionally, standard vehicle lights are usually limited to be used for breaking, signaling or similar functions, and are not versatile to bring separate attention to a stopped truck vehicle.

For Example, U.S. Pat. No. 8,237,557 to Hertz et al. shows and describes a pickup truck tailgate safety light system, that generally must be incorporated into the tailgate of a pickup truck, and would not be available as an after-market product that could be added by a truck owner to their existing truck tailgate.

Over the years various types of products have been proposed for providing extra lights to tailgates on trucks, but would not be satisfactory as an after-market product. U.S. Pat. No. 6,799,873 to Fox; U.S. Pat. No. 9,205,774 to Kennemer et al. each describe other light systems that can be attached over the top edge of a truck tailgate. However, these devices are intended to be easily attached as well as detached from the top of the tailgate. As such, these types of devices can be easily removed and stolen when the truck is left alone.

Thus, the need exists for solutions to the above problems with the prior art.

SUMMARY OF THE INVENTION

A primary objective of the present invention is to provide systems, devices, and methods for a truck tailgate LED (light emitting diode) cap cover for attaching on top of truck tailgates as a safe and secure after-market or retrofit product.

A secondary objective of the present invention is to provide a truck tailgate LED (light emitting diode) cap system, device and method, which can be easily attached to tailgates with fasteners but not easily removed without unlocking locks covering the fasteners.

A third objective of the present invention is to provide a truck tailgate LED (light emitting diode) cap system, device and method, which can be used to draw visibility to the truck on a job site or anywhere where added visibility is required for safety.

A fourth objective of the present invention is to provide a truck tailgate LED (light emitting diode) cap system, device and method, which can be activated as a strobe light while the vehicle is in motion or is parked on a job site.

The cap cover has LEDs (light emitting diodes) in a LED light bar across the length of the cap cover. The LEDs can be powered by being attached to the truck 12 volt battery. The cap cover can be formed from molded plastic, and the LEDs can be activated by a switch on the cap cover and/or activated remotely by a key fob that can be carried with the driver.

The LEDs are intended to be used when the truck is stopped at a job site, and can be used to draw visibility to the truck anywhere visibility is needed.

The LED cap covers can include key locking doors which prevent someone from accessing the hex head bolts which attach the cap cover with LEDs to the tailgate.

A preferred embodiment has the cap cover mounted to the top and upper side edges of the tailgate by hex head bolts on the top of the cap cover and on the upper front edge of the cap cover.

A plurality of key locked doors can be mounted on top of the cap cover, which cover each of the hex head bolts. The key lock doors when locked prevents someone from unscrewing the hex head bolts.

When the driver uses a key to open the key lock doors, the doors can be removed, and access to the hidden hex head bolts is now available.

With the key lock doors removed, the driver, can use a wrench to unfasten the previously inaccessible hex head bolts, and then remove the cap cover having the LEDs.

Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

FIG. 2A is a front view of the LED cap cover of FIG. 1A.

FIG. 2B is a rear view of the LED cap cover of FIG. 1A.

FIG. 2C is a top view of the LED cap cover of FIG. 1A.

FIG. 2D is a bottom view of the LED cap cover of FIG. 1A.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

Figure 1A:
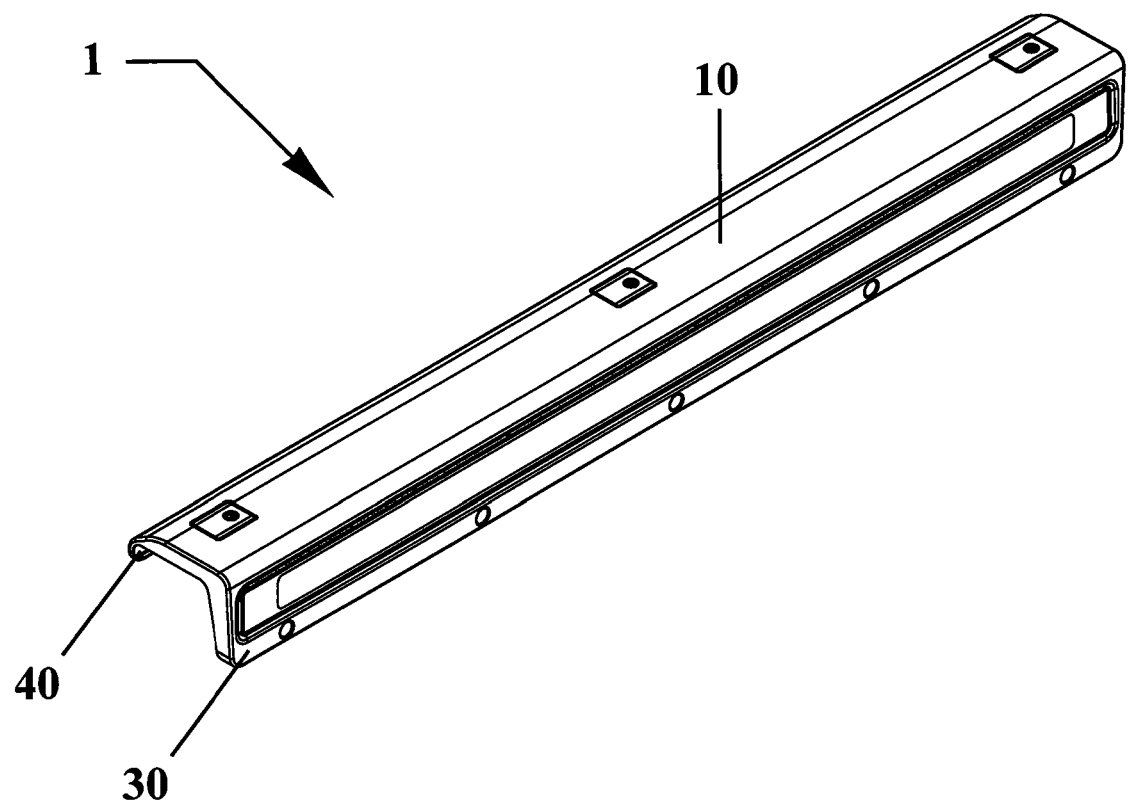
FIG. 1A is a top left front perspective view of the LED cap cover.
Figure 1B:
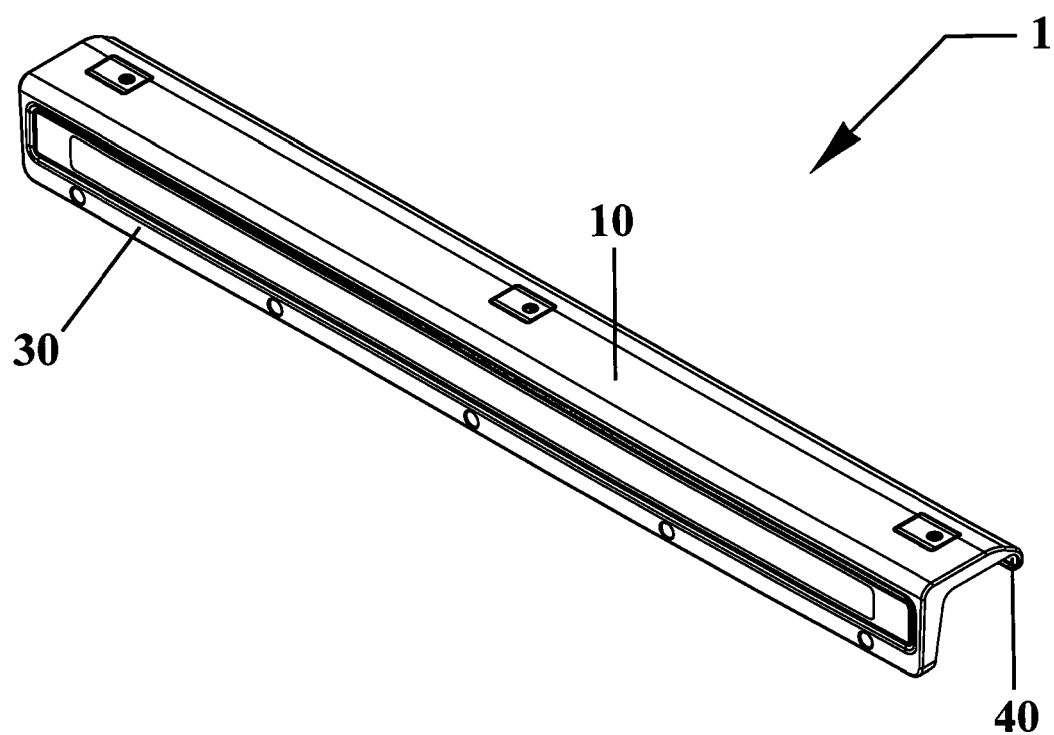
FIG. 1B is a top right front perspective view of the LED cap cover of FIG. 1A.
Figure 1C:
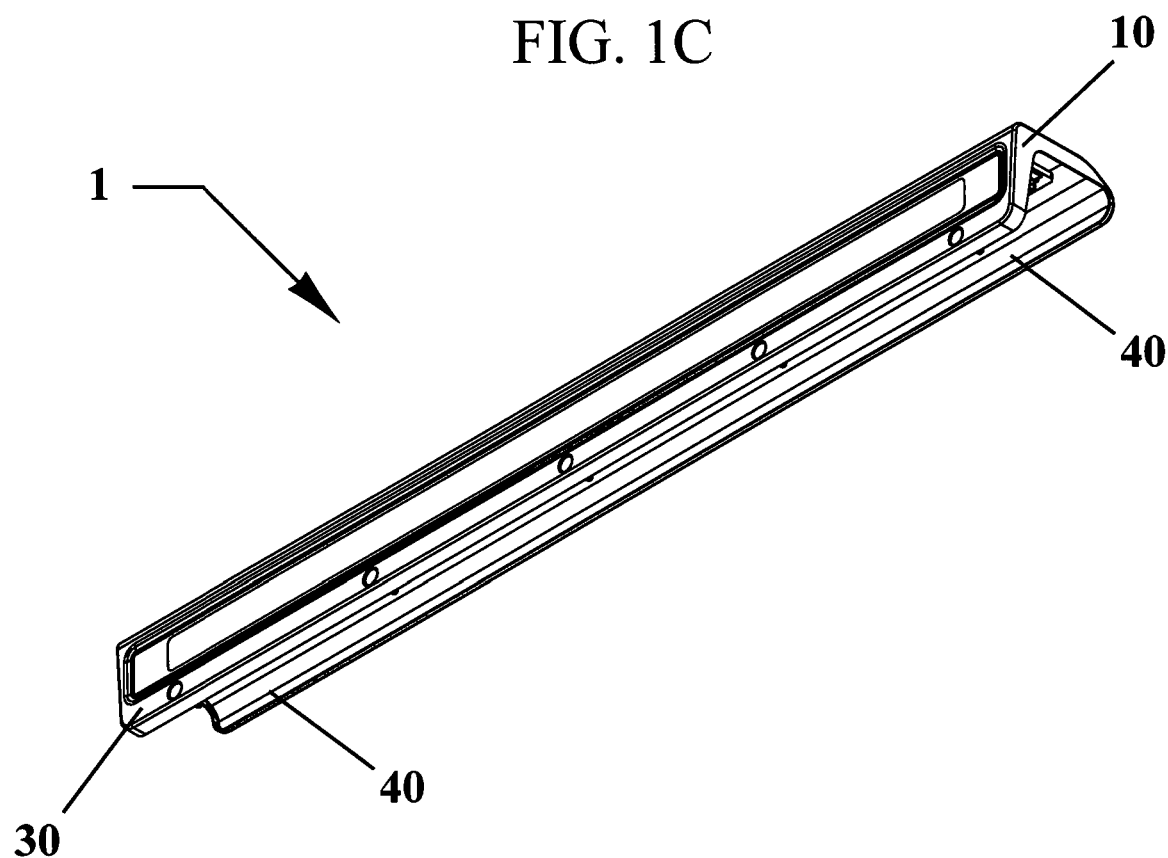
FIG. 1C is a bottom left front perspective view of the LED cap cover of FIG. 1A.
Figure 1D:
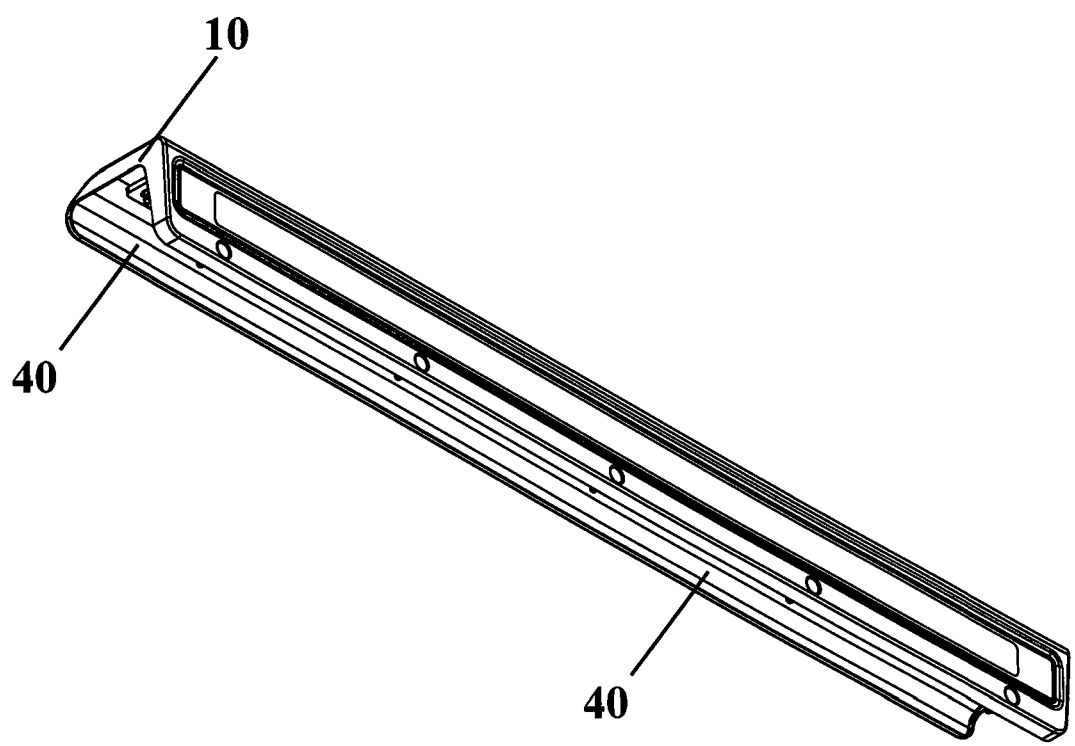
FIG. 1D is a bottom right front perspective view of the LED cap cover of FIG. 1A.

1 LED cap cover
10 elongated top
12 threaded fastener(s) (bolts, screws, and the like)
13 washers/locking nuts
14 locking door
15 key lock
16 pivoting lock tab
18. key for key lock
20 compartment(s)
21 step ledge
22 side slit for the outer end of locking tab 16
24 cup shaped bottom of the compartment(s) 20
29 through-holes in bottom of compartment(s)
30 elongated front side
33 elongated channel for motherboard assembly of LEDs
34 motherboard assembly of LEDs
35 power plug
36 flat lens
37 front fasteners (screws, bolts, and the like)
38 through-holes for fasteners
39 socket indentation(s) for fastener(s) 37
40 elongated rear lip
41 interior facing edge
100 tailgate
110 top of tailgate
120 front upper edge of tailgate
130 rear upper edge of tailgate FIG. 1A is a top left front perspective view of the LED cap cover 1. FIG. 1B is a top right front perspective view of the LED cap cover 1 of FIG. 1A. FIG. 1C is a bottom left front perspective view of the LED cap cover 1 of FIG. 1A. FIG. 1D is a bottom right front perspective view of the LED cap cover 1 of FIG. 1A.

Figure 2E:
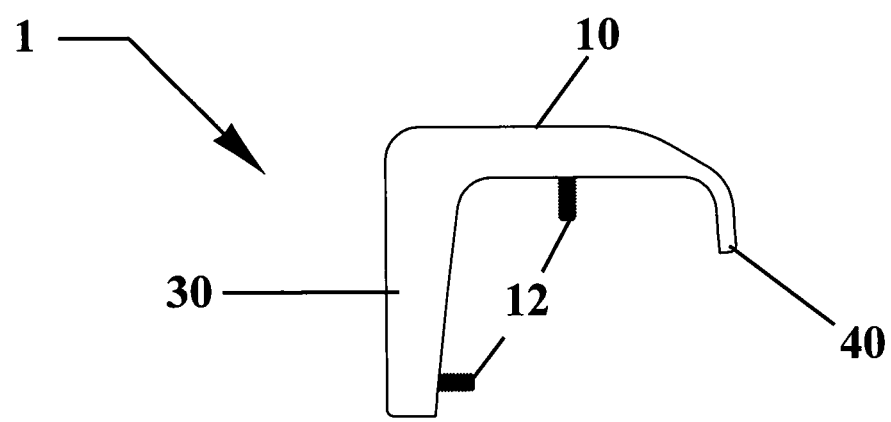
FIG. 2E is a right end view of the LED cap cover of FIG. 1A.
Figure 2F:
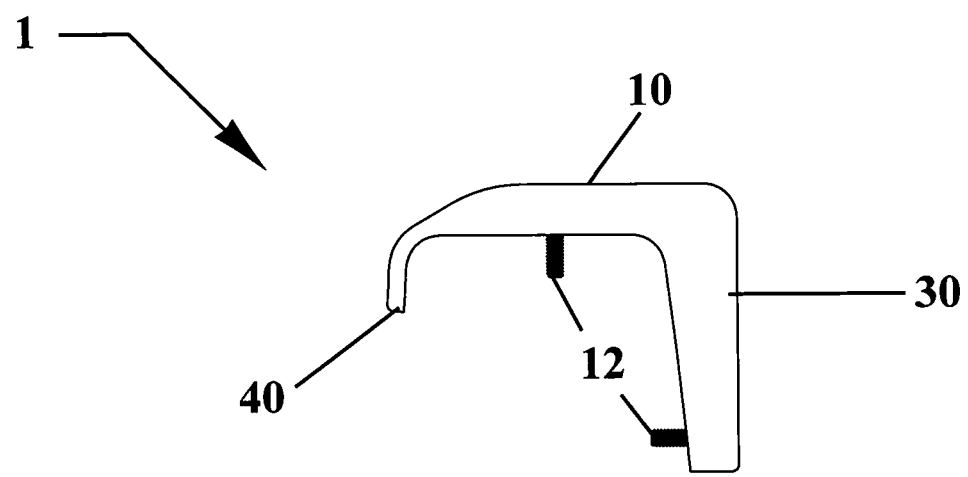
FIG. 2F is a left end view of the LED cap cover of FIG. 1A.

FIG. 2A is a front view of the LED cap cover 1 of FIG. 1A. FIG. 2B is a rear view of the LED cap cover 1 of FIG. 1A. FIG. 2C is a top view of the LED cap cover 1 of FIG. 1A. FIG. 2D is a bottom view of the LED cap cover 1 of FIG. 1A. FIG. 2E is a right end view of the LED cap cover 1 of FIG. 1A. FIG. 2F is a left end view of the LED cap cover 1 of FIG. 1A.

Referring to FIGS. 1A-2F, the cap cover 1 can include an elongated top having a generally rectangular configuration with an elongated rear lip 40, and a generally rectangular elongated front 30, that can be formed from ABS plastic, which together can form the housing for the cap cover 1.

Figure 3:
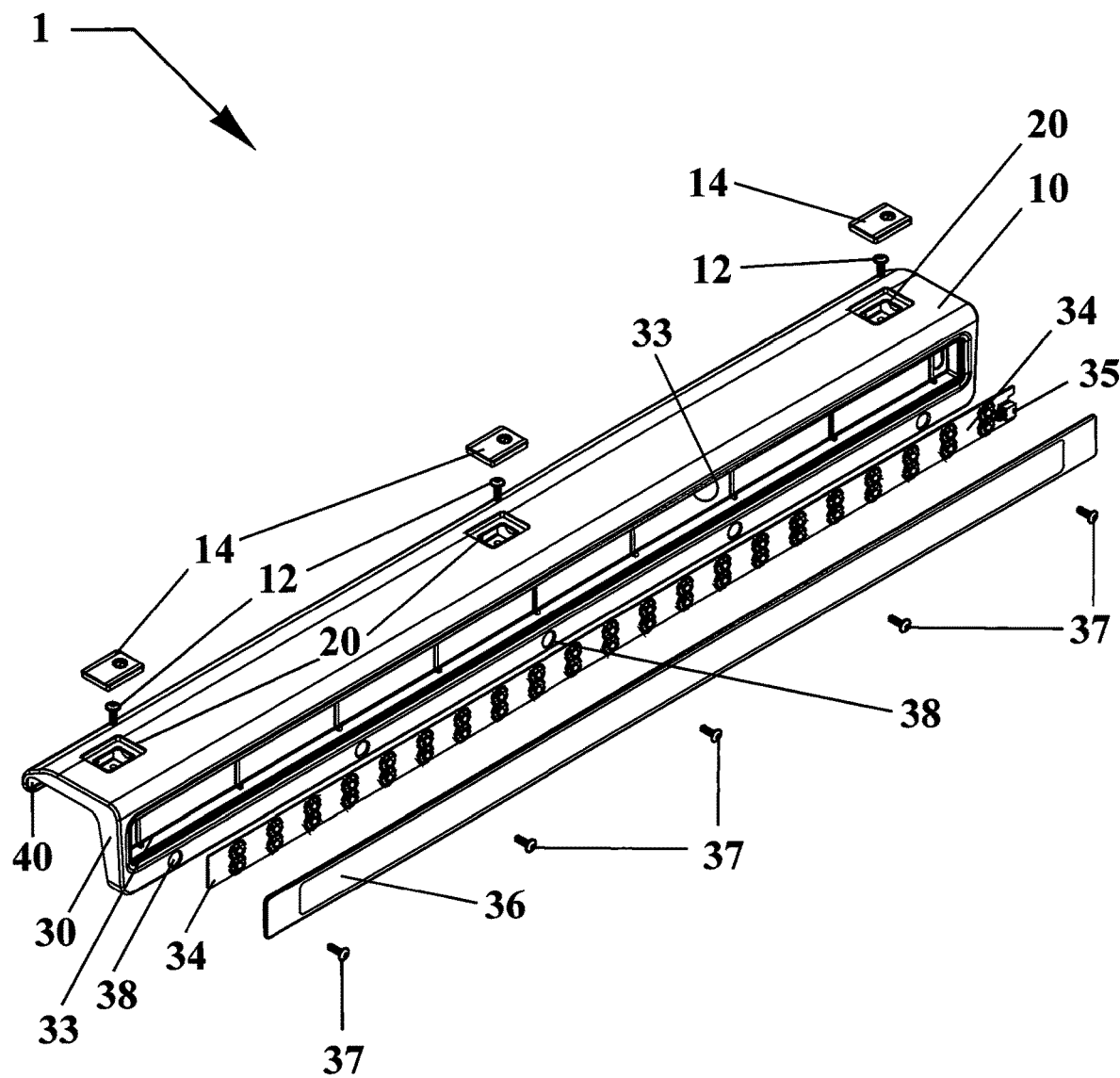
FIG. 3 is an exploded view of the LED cap cover of FIG. 1A.
Figure 3A:
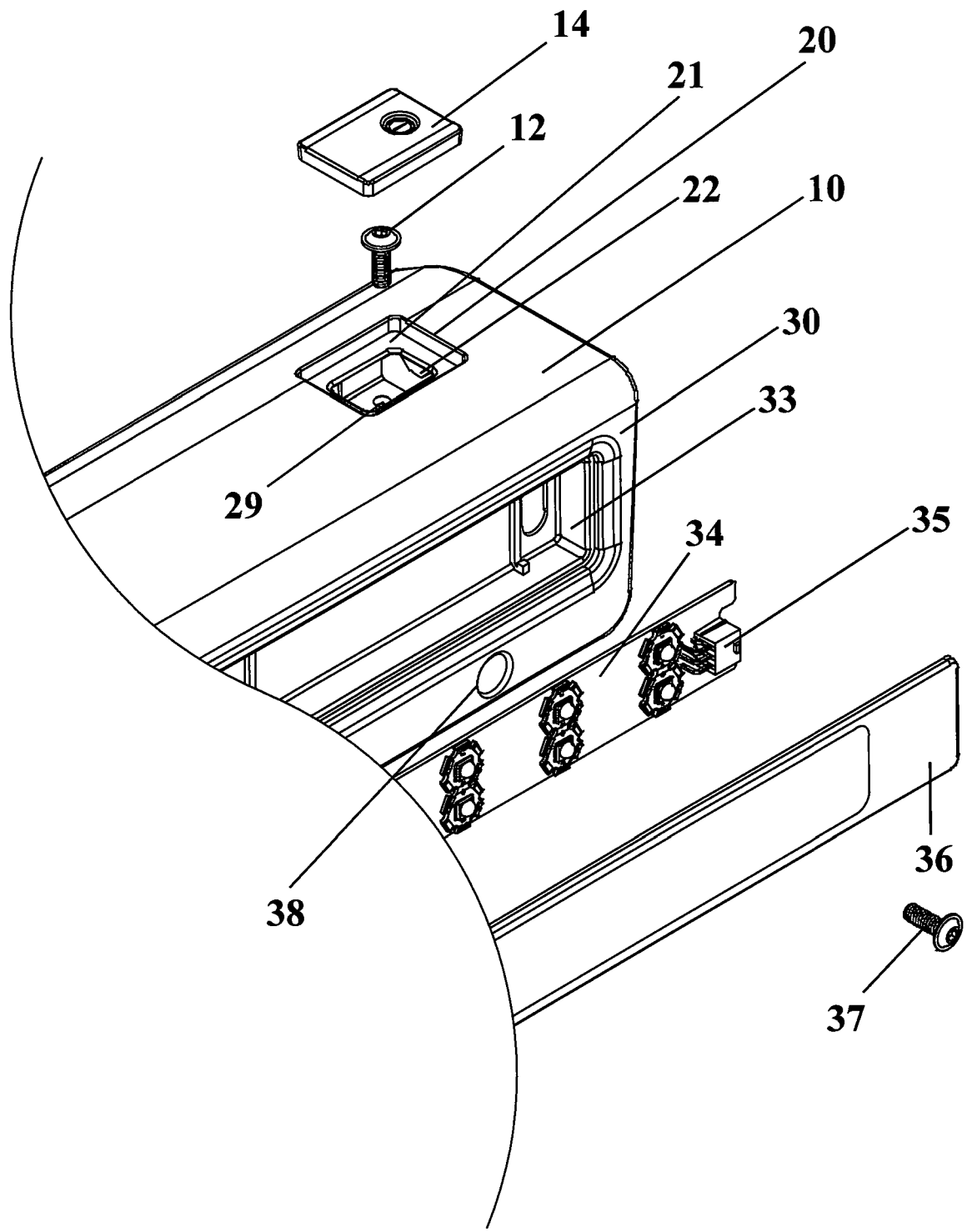
FIG. 3A is an enlarged view of a right lock compartment of the LED cap cover of FIG. 3.

FIG. 3 is an exploded view of the LED cap cover 1 of FIG. 1A. FIG. 3A is an enlarged view of a right lock compartment 20 of the LED cap cover 1 of FIG. 3.

Referring to FIGS. 1A-3A, the elongated top 10 of the LED cap cover 1 can include one or more compartments 20, each having a through-hole 29 in the bottom of the compartment(s) 20 so that a threaded type fastener 12 can pass therethrough. The threaded fastener(s) 12 can include but not be limited to screws, bolts, and the like. A preferred embodiment of the fastener(s) 12 can be hex head bolts, which can add additional protection for requiring a hex head socket wrench in order for the fastener(s) 12 to be removed.

The threaded end(s) of the threaded type fastener(s) 12 can extend through the other side of the top 10 (as shown in FIGS. 2E-2F). Each of the compartment(s) 20 can have a removable locking door 14 (which will be described later in greater detail) that can be sized to fit the upper opening to the compartment(s) 20 and sit on an internal step ledge(s) 21. While the preferred embodiment of the cap cover 1 shows three compartments 20, the invention can be used with less or more compartments 20 as needed.

Along the front 30 of the LED cap cover 1 can be an elongated channel 33 that can house a motherboard assembly of LEDs (light emitting diodes) 34. The motherboard assembly 40 can be sized to tightly fit within the channel 33 and/or be attached by an adhesive, and the like. On the end of the motherboard assembly of LEDs 34 can be a plug 35 that can attach to a power supply, to be described later. A flat lens 36 can be formed from a clear plastic material can be adhered to the front 30 to cover both the motherboard assembly of LEDs 34 and channel 33.

A plurality of threaded fasteners 37, such as but not limited to screws, bolts and the like, can have threaded shaft portions that pass into through-holes 38 across the front 30 of the LED cap cover 1.

A preferred embodiment of the motherboard assembly of LEDs 34 can have up to 42 or more LEDs. LEDs that can be used, can include but not be limited the types of LEDS shown and described in U.S. Published Patent Application Publications: 2005/0146888 to Metcalf and 2017/0184271 to Norris et al. which are both incorporated by reference in their entirety.

Figure 4:
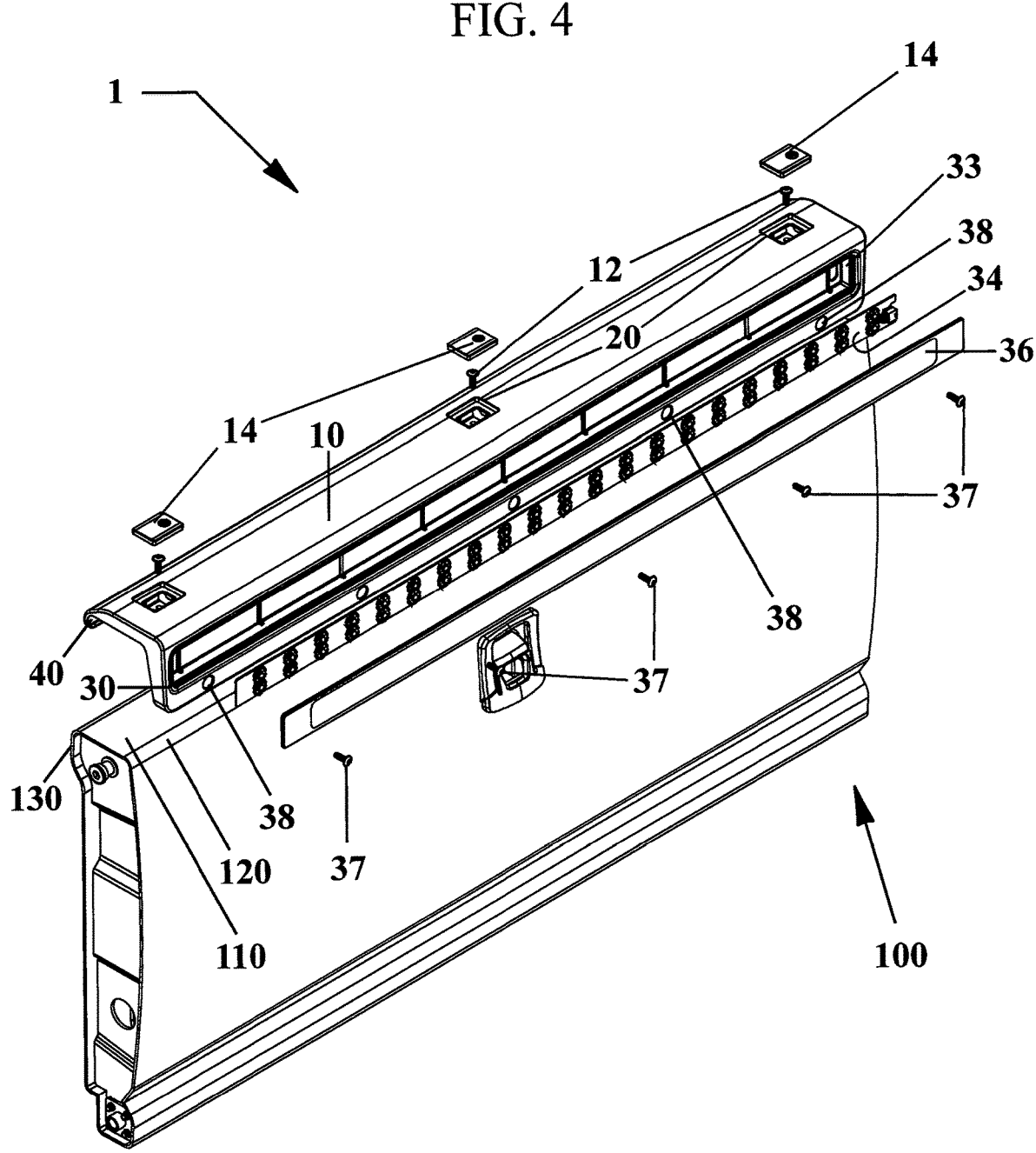
FIG. 4 is another exploded view of the cap cover of FIG. 3 positioned above the top of a tailgate.
Figure 4A:
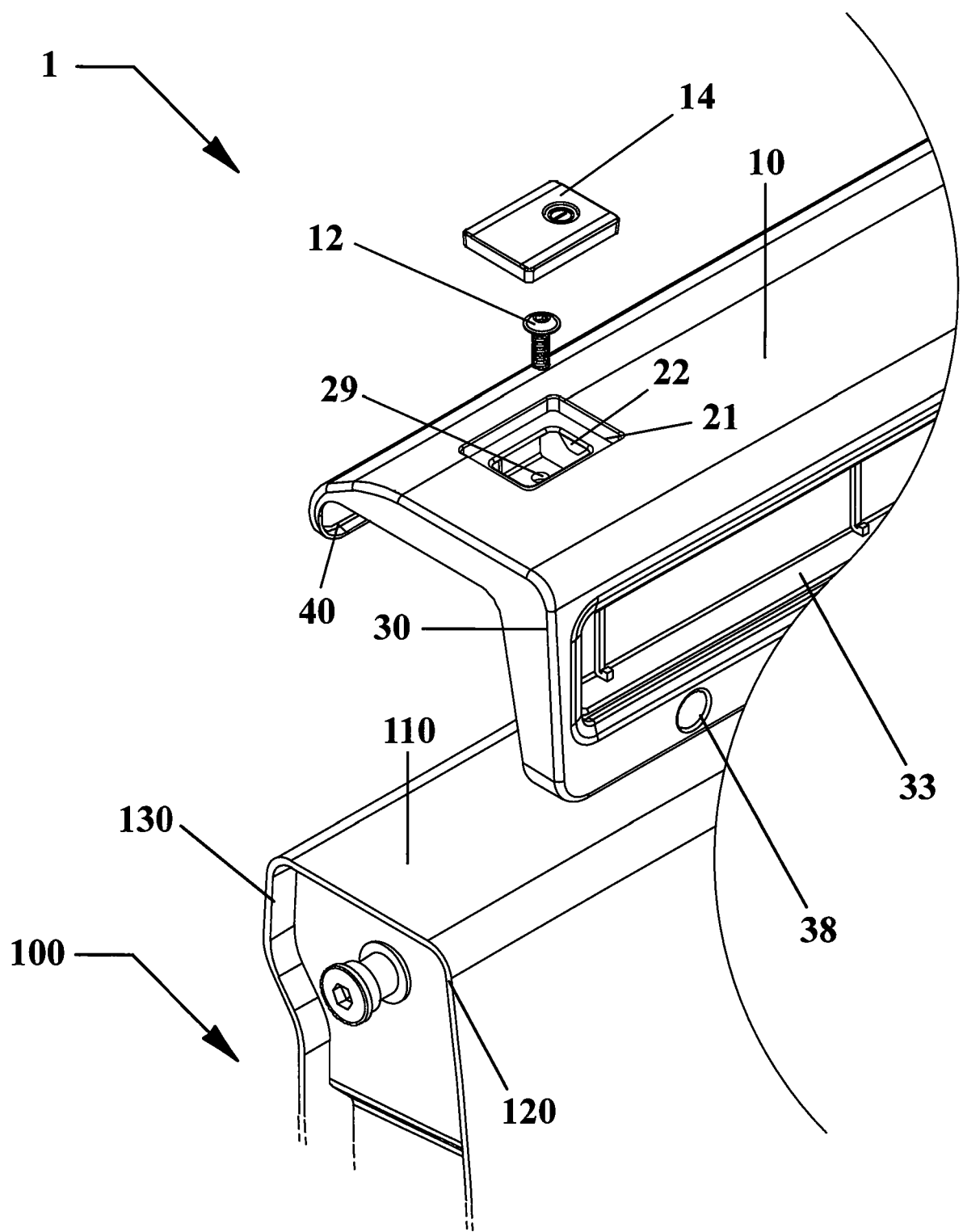
FIG. 4A is an enlarged view of the left lock compartment of the LED cap cover of FIG. 4.

FIG. 4 is another exploded view of the cap cover 1 of FIG. 3 positioned above the top 110 of a tailgate 100. FIG. 4A is an enlarged view of the left lock compartment 20 of the LED cap cover 1 of FIG. 4.

Figure 5:
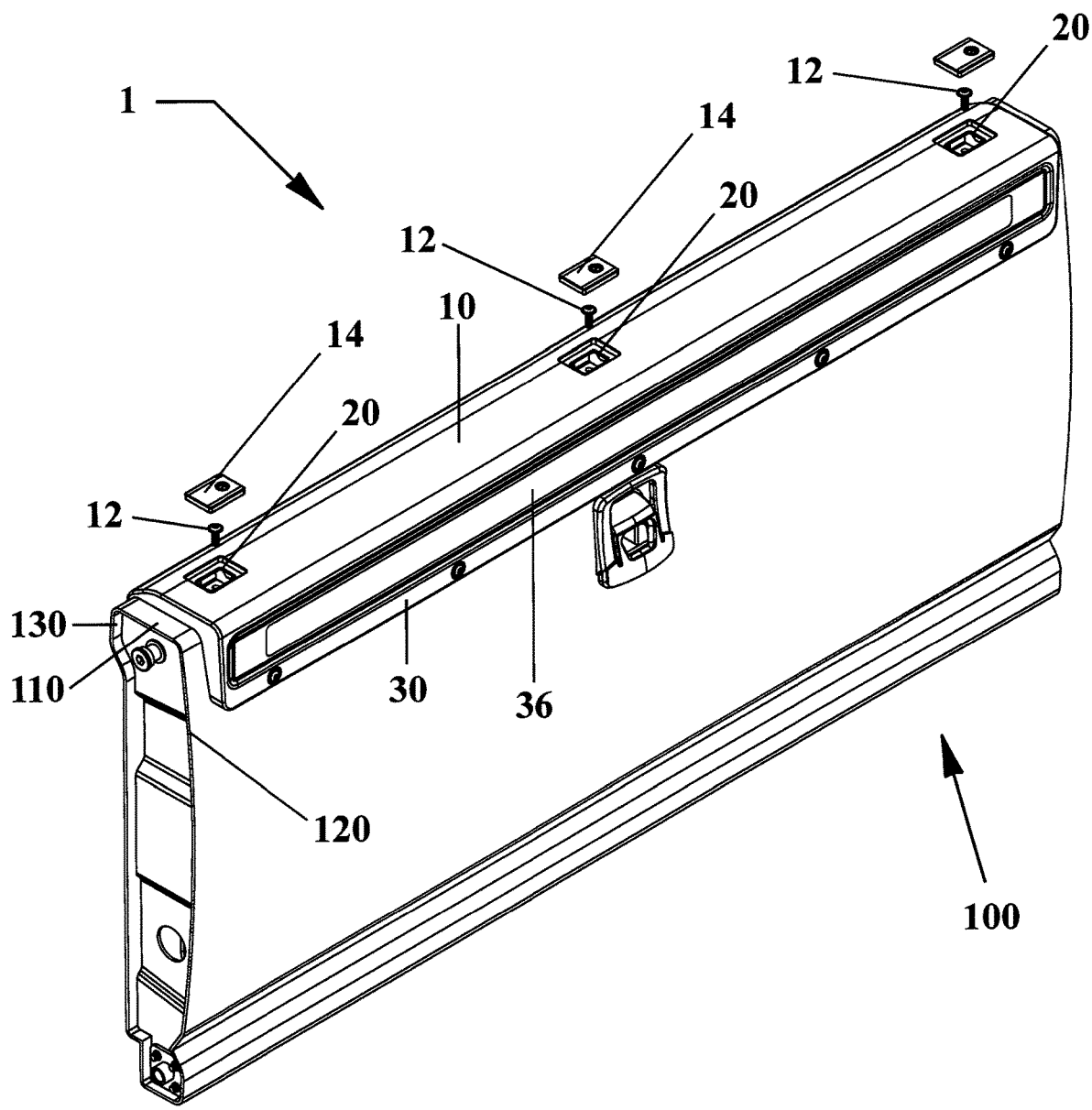
FIG. 5 is a partial assembled view of the cap cover of the preceding FIG. 4 on the top of the tailgate with the locking doors and fasteners ready to be attached.
Figure 5A:
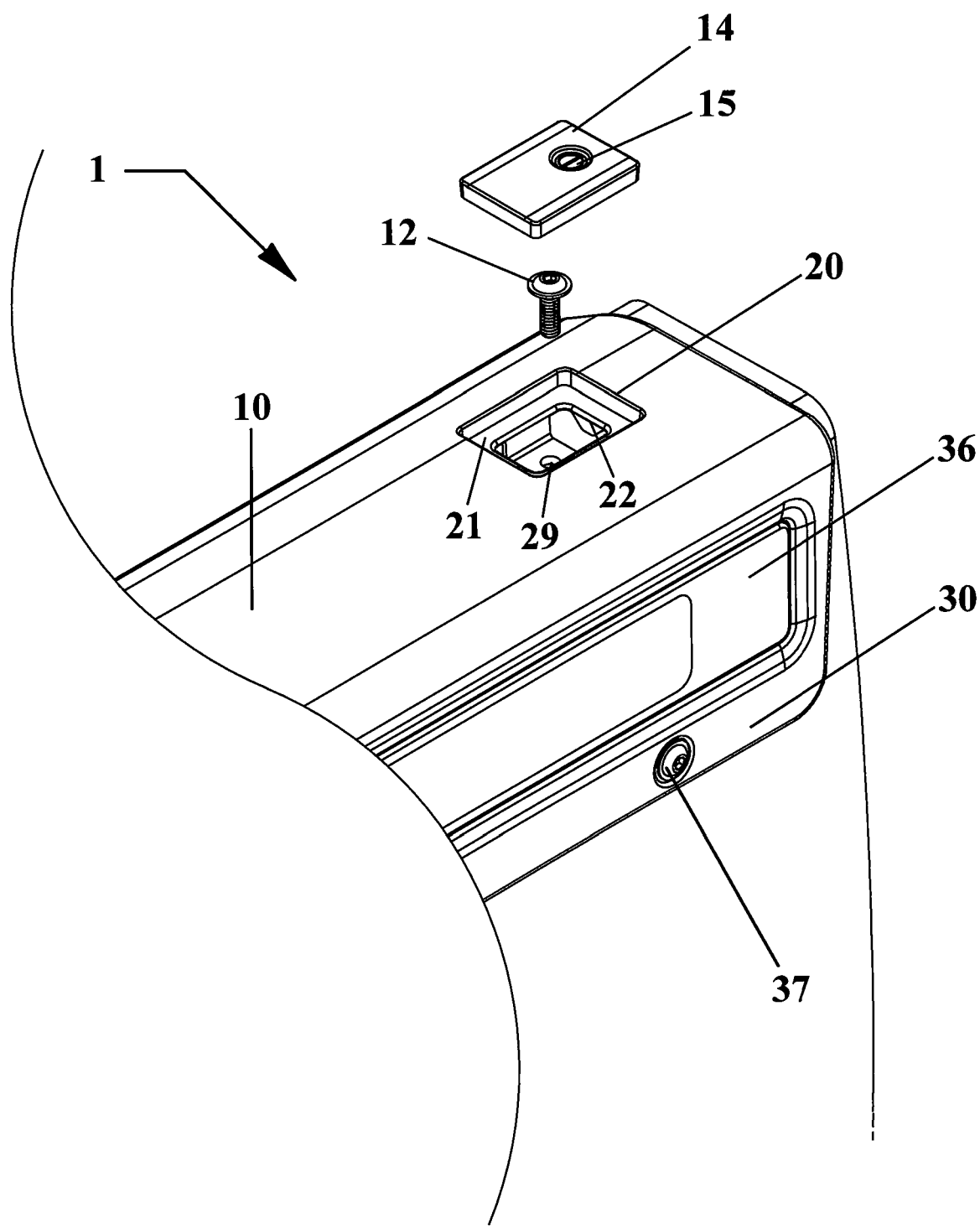
FIG. 5A is an enlarged view of the right lock compartment of FIG. 5.

FIG. 5 is a partial assembled view of the cap cover 1 of the preceding FIG. 4 on the top 110 of the tailgate 100 with the locking doors 14 and fasteners 12 ready to be attached. FIG. 5A is an enlarged view of the right lock compartment 20 of FIG. 5.

Referring to FIGS. 1A-5A, the LED cap cover 1 can be positioned so that the elongated top 10 overlays the top 110 of the tailgate 100, with the cap cover 1 sized so that the rear elongated lip 40 abuts against the rear upper edge 130 of the tailgate 100 and the front 10 of the cap cover against the upper front 120 of the tailgate 100.

An installer can screw the front fasteners 37 with or without washers and locking nuts into through-holes 38 and into the upper front 120 of the tailgate 100. The installer can also thread the threaded ends of fasteners 12 into the through-holes 29 in the bottom of the compartment(s) 20 and into the top 110 of the tailgate 100. The locking doors 14 can be used to prevent others from removing the fasteners 12 when the truck is stopped or parked, preventing the theft of the LED cap cover 1.

Figure 6A:
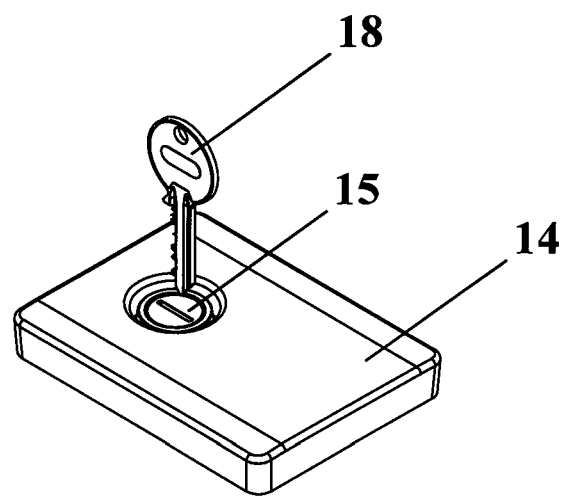
FIG. 6A is an enlarged top perspective view of a single locking door with key for the cap cover of the preceding figures.
Figure 6B:
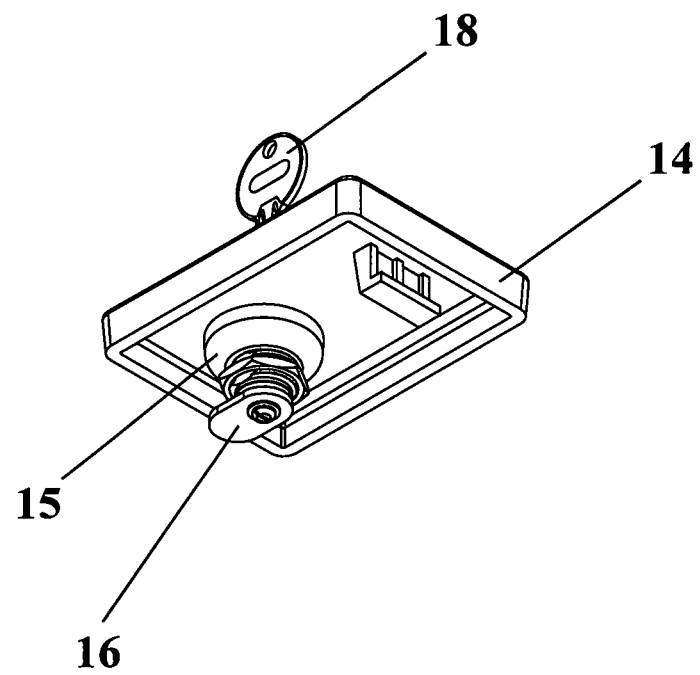
FIG. 6B is a bottom perspective view of the locking door with key of FIG. 6A.
Figure 6C:
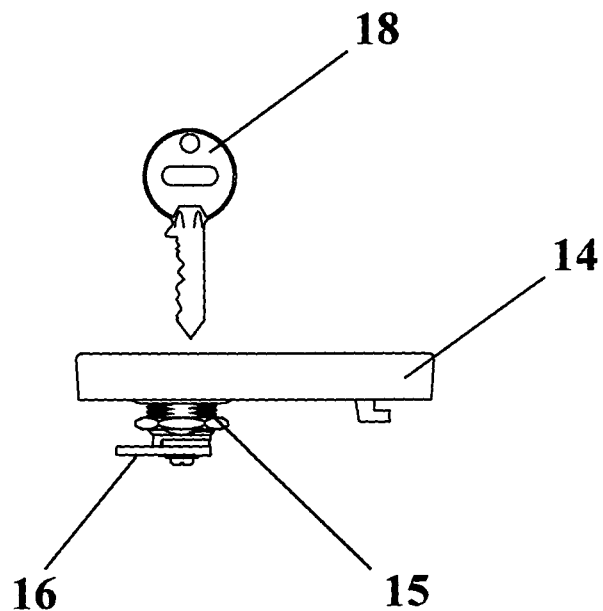
FIG. 6C is a side view of the locking door and key of FIG. 6A.
Figure 6D:
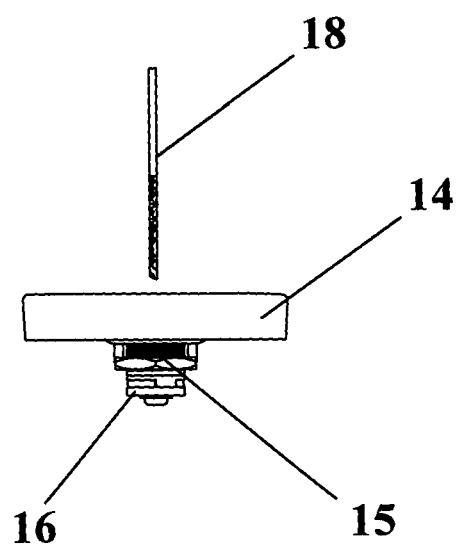
FIG. 6D is a front view of the locking door and key of FIG. 6A.
Figure 6E:
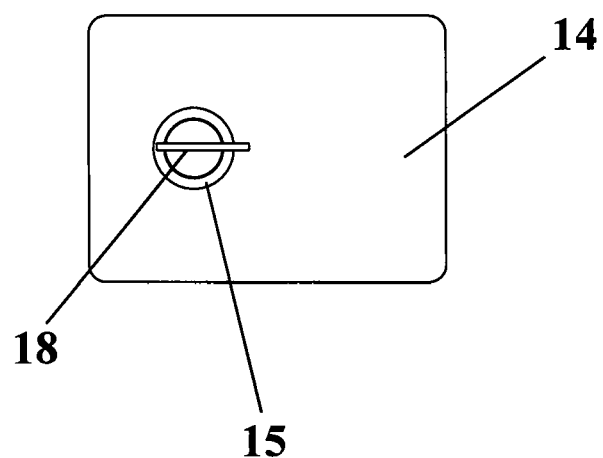
FIG. 6E is a top view of the locking door of FIG. 6A.
Figure 6F:
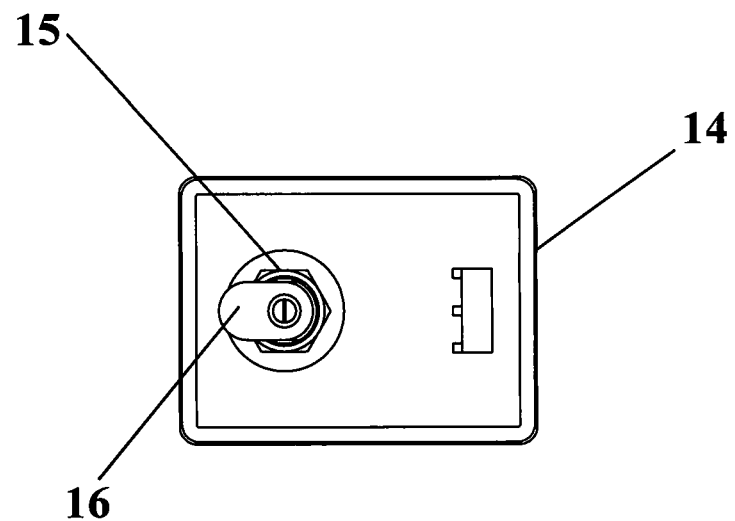
FIG. 6F is a bottom view of the locking door of FIG. 6A.

FIG. 6A is an enlarged top perspective view of a single locking door 14 with key 18 for use with a lock 15 for covering the compartments 20 of the cap cover 1 of the preceding figures. FIG. 6B is a bottom perspective view of the locking door 14 with key 18 of FIG. 6A. FIG. 6C is a side view of the locking door 14 and key 18 of FIG. 6A. FIG. 6D is a front view of the locking door 14 and key 18 of FIG. 6A. FIG. 6E is a top view of the locking door 14 of FIG. 6A. FIG. 6F is a bottom view of the locking door 14 of FIG. 6A.

Referring to FIGS. 1A-6F, each of the locking door(s) 14 can be sized to tightly fit the upper opening of the compartment(s) 20 and sit on the internal step ledge(s) 21. The locking door(s) 14 when attached can provide a waterproof seal to prevent moisture intrusion into the compartment(s) 20. Optional seals, such as but not limited to elastomeric, rubber and plastic washers, liners, and the like, can be used to waterproofing the opening into the compartment(s) 20.

Each of the key locks 15 on the locking doors 14 can preferably be keyed to an identical key 18 so that one key can open all of the locking doors 14. A preferred embodiment of the locking doors 14 is to have a key lock 15 which can rotate a pivoting tab 16 that can pivot into and out of a side slit 22 on an inner side of the compartment(s) 20.

Figure 7:
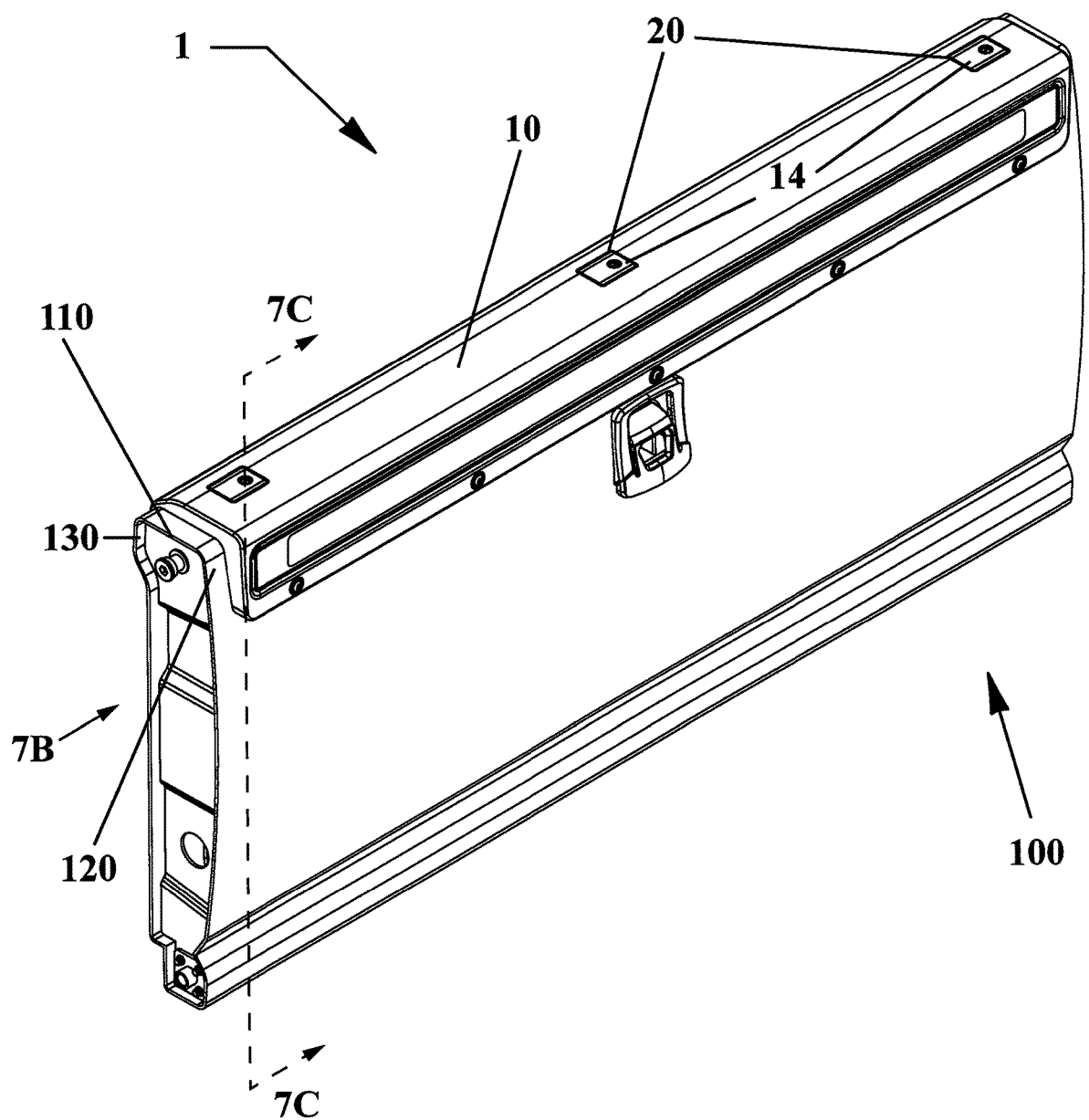
FIG. 7 is an assembled view of the cap cover of FIG. 5 attached to the tailgate.
Figure 7A:
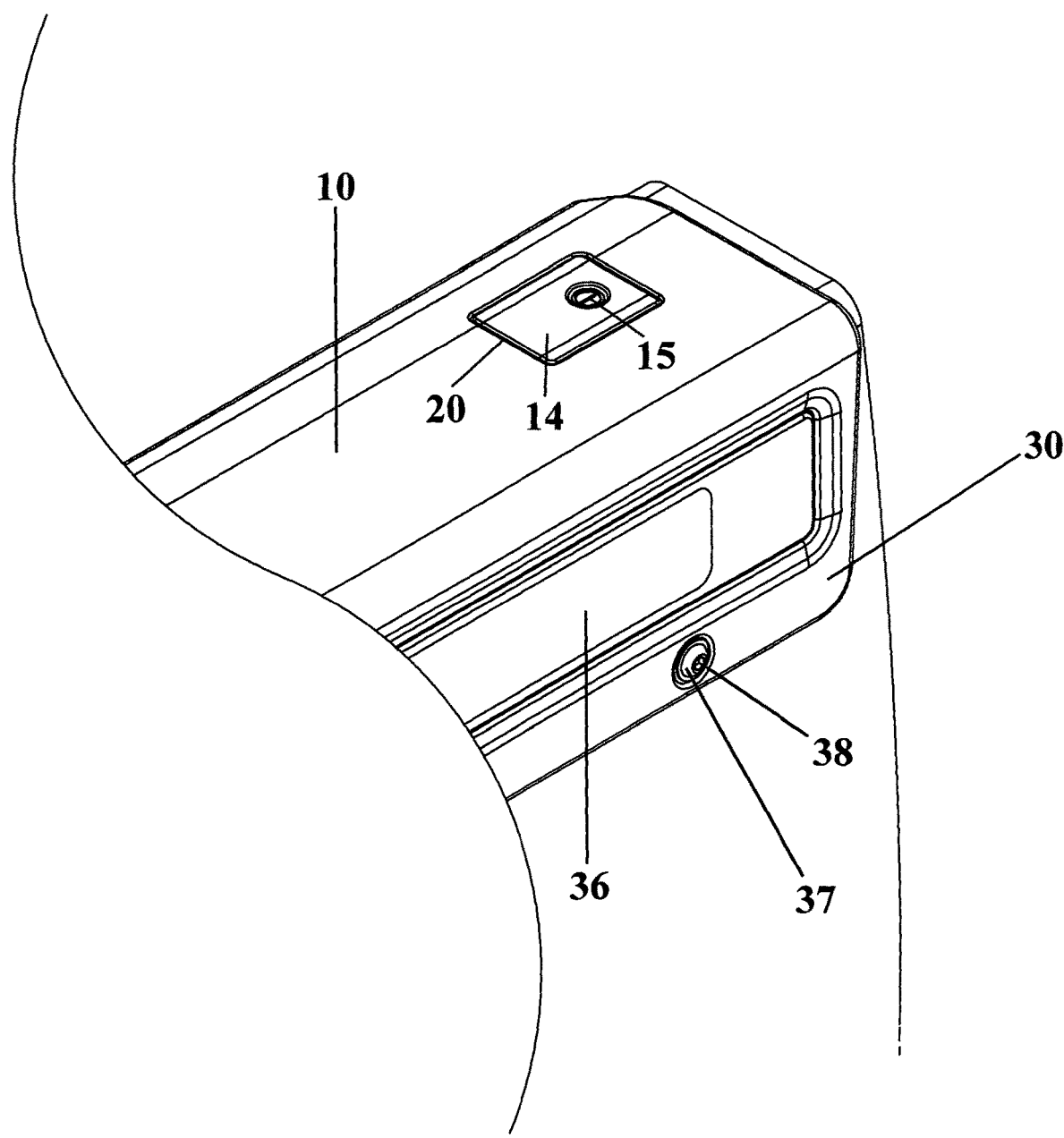
FIG. 7A is an enlarged view of the right compartment portion of the cap cover on the tailgate of FIG. 7.
Figure 7B:
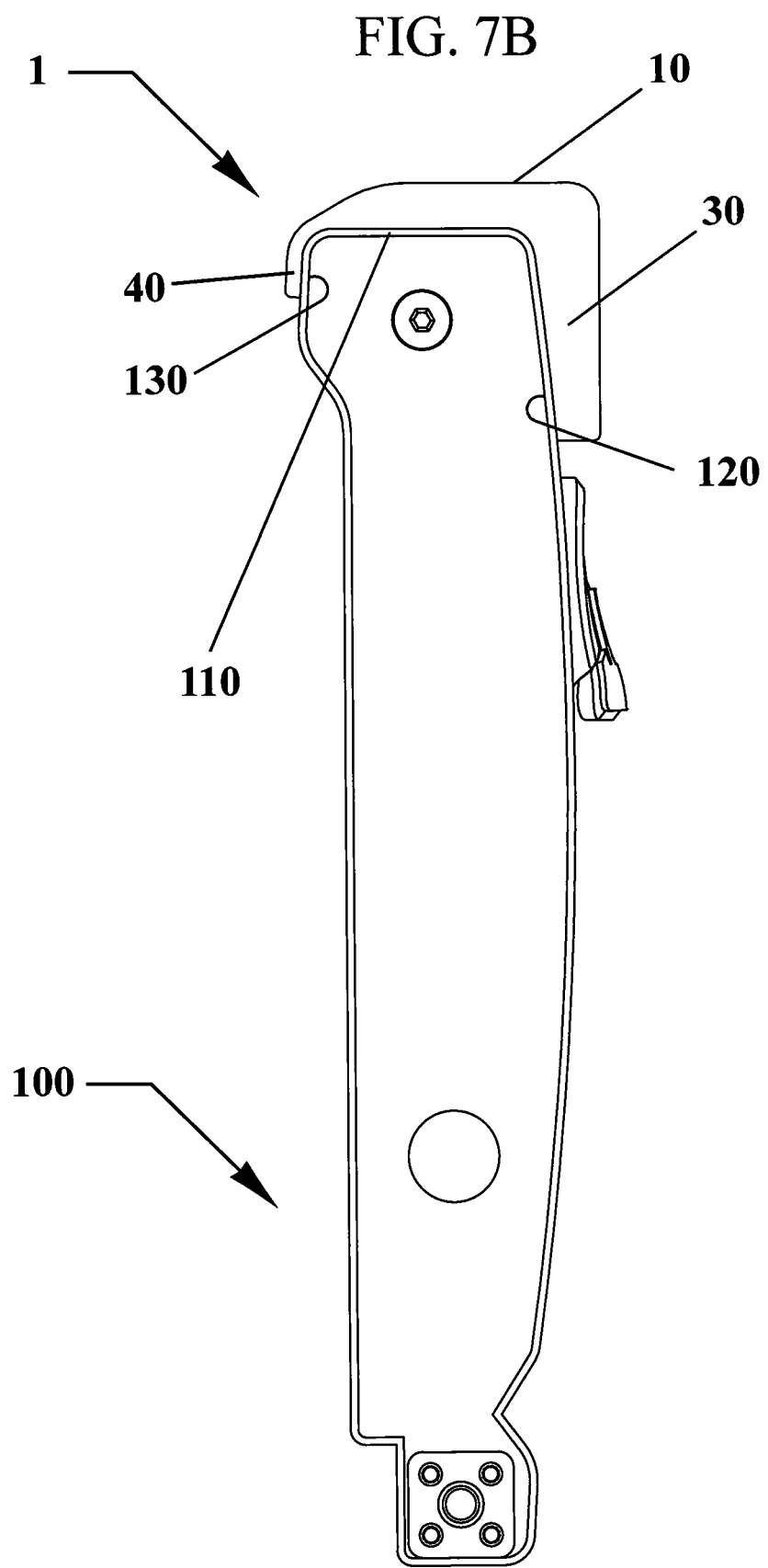
FIG. 7B is a left end view of the assembled cap cover on the tailgate of FIG. 7.
Figure 7C:
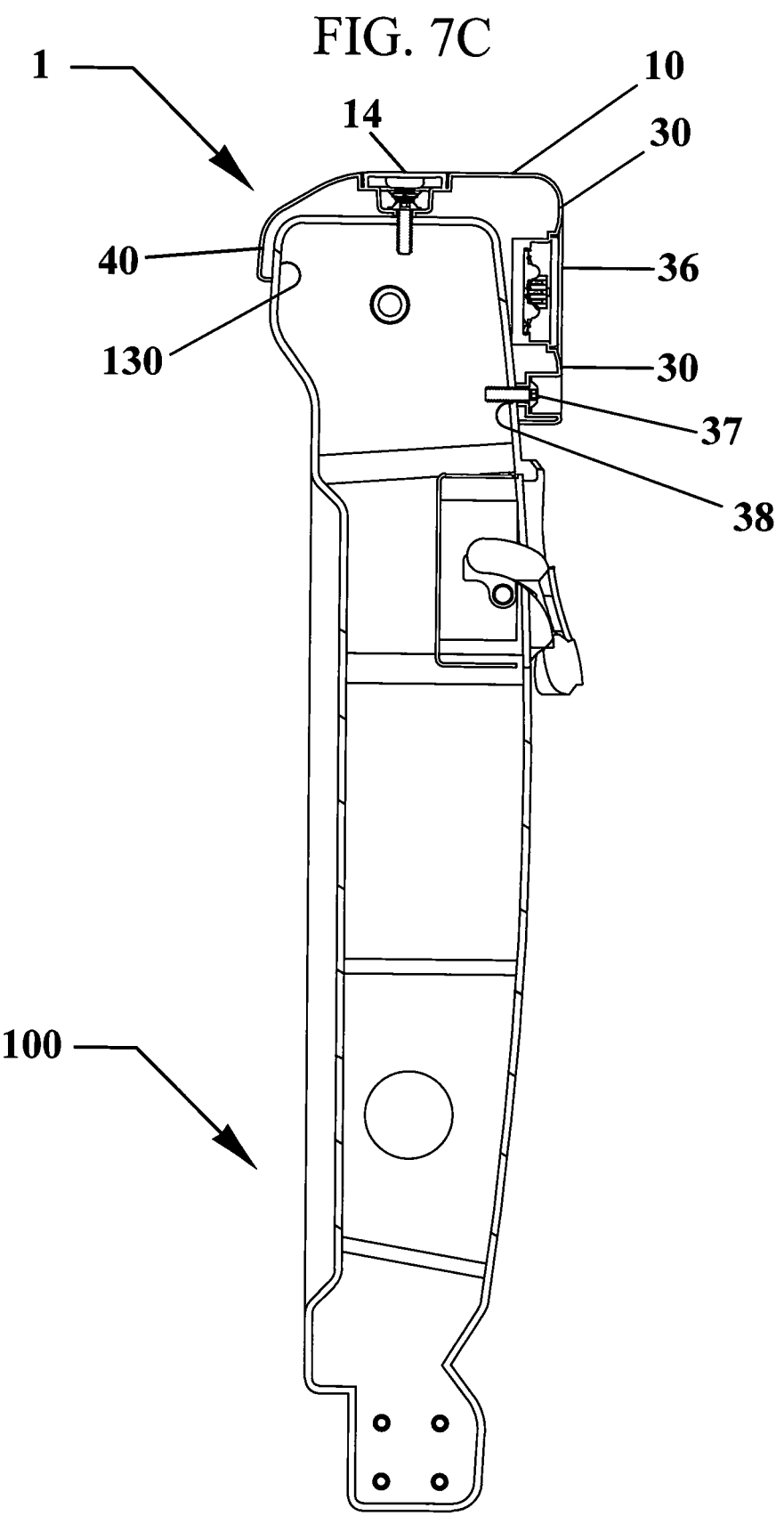
FIG. 7C is a cross-sectional view of the assembled cap cover on tailgate of FIG. 7 along arrows 7C.
Figure 7D:
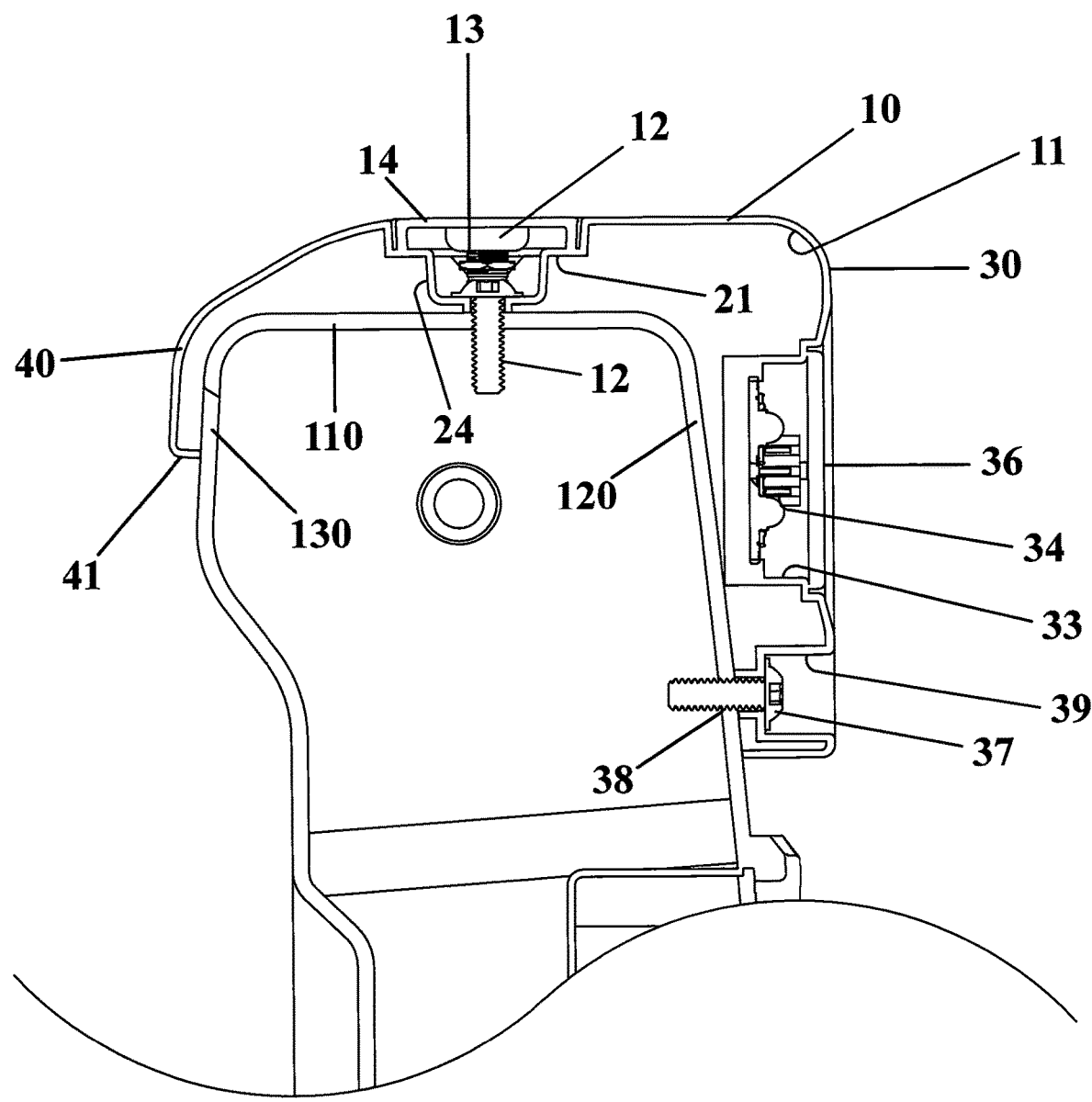
FIG. 7D is an enlarged view of the top of the cross-sectional view of FIG. 7C.

FIG. 7 is an assembled view of the cap cover 1 of FIG. 5 attached to the tailgate 100. FIG. 7A is an enlarged view of the right compartment portion 20 of the cap cover 1 on the tailgate 100 of FIG. 7. FIG. 7B is a left end view of the assembled cap cover 1 on the tailgate 100 of FIG. 7. FIG. 7C is a cross-sectional view of the assembled cap cover 1 on the tailgate 100 of FIG. 7 along arrows 7C. FIG. 7D is an enlarged view of the top of the cross-sectional view of FIG. 7C.

Referring to FIGS. 7-7D, the cap cover 1 can be formed from a top 10, front 30 and elongated rear lip 40 that together can form a single molded housing. The underside of the top 10 of the cap cover 1 can have a generally raised shell surface 11 that can be separated from the top 110 and upper rear edge of the upper rear 130 and upper front edge of the upper front 120 of the tailgate 100, so that an airgap can be formed therebetween. The elongated rear lip 40 can be raised above with a lower internal facing edge 41 pressed against the upper rear 130 of the tailgate 100.

The bottom of the cup shape 24 molded inside of the compartment 20 can formed so as to sit against the top 110 of the tailgate 100. The threaded fastener(s) 12 can include washers/locking nuts 13 for creating a tight seal to the top 110 of the tailgate 100. With the internal facing edge 41 cup shaped compartment 24 an airgap can exist between the most of the top 110 of the tailgate 100 and the cap cover 1.

On the front 30 of the LED cap cover 1 socket indentation(s) 39 can allow for the heads of fastener(s) 37 to be below the outer surface of the front 30 of the cap cover 1.

As shown in FIG. 7D, the locking door(s) 14 can sit flush to with the outer surface of the top 10 of the LED cap cover 1.

39 socket indentation(s) for fastener(s) 37

Figure 8:
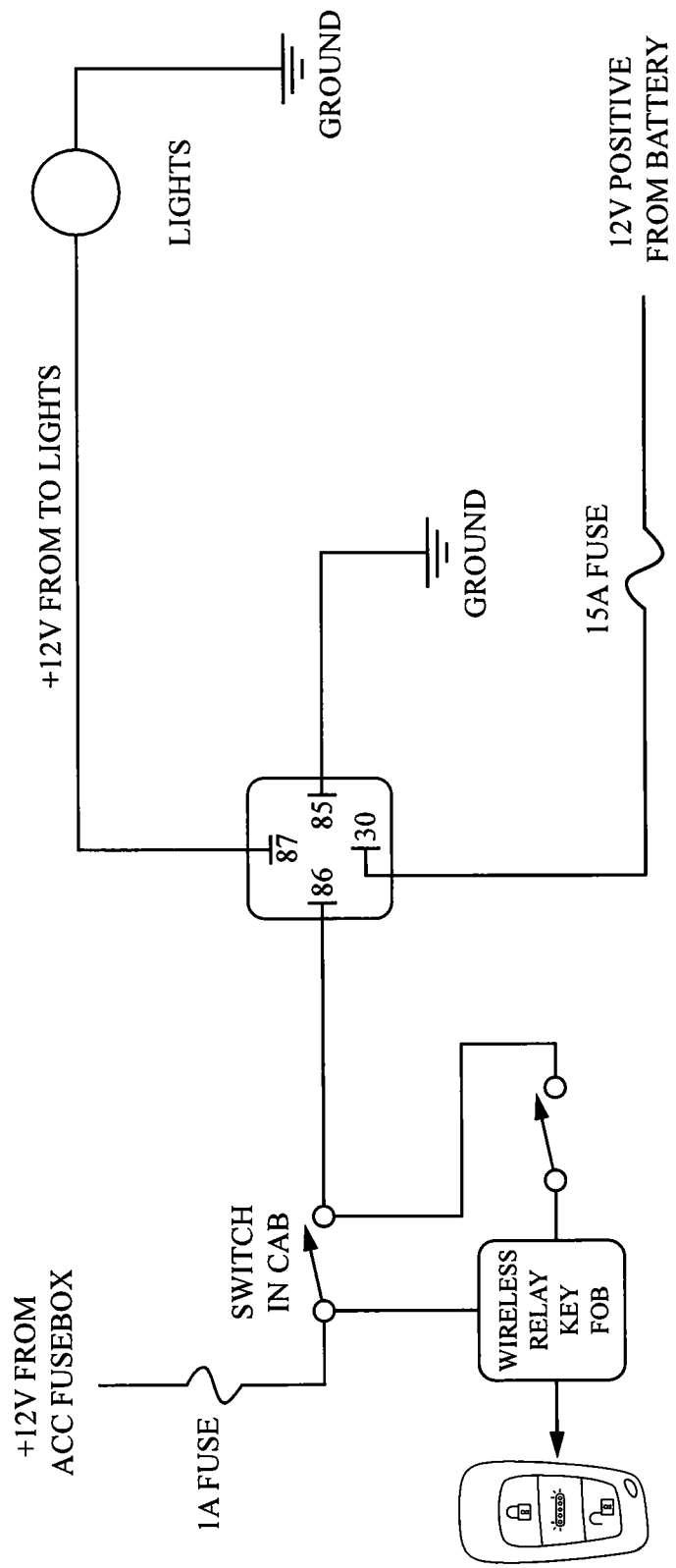
FIG. 8 is a circuit diagram for the assembled LED cap cover of the preceding figures with a key fob.

FIG. 8 is a circuit diagram for the assembled LED cap cover of the preceding figures with a key fob. The power plug 35 of the motherboard assembly of LEDs 34 previously described can be connected to the existing 12 volt battery power supply in the truck vehicle. Optionally, the LED cap cover 1 can be connected to a separate rechargeable battery power supply.

A wireless key fob can be used to activate the LEDs (light emitting diodes). Activating the LEDs can be added as a feature to factory key fob or can have a standalone remote activation device.

Other types of activating the LEDs can also be used such as but not limited to a toggle switch, magnetic switch, and any other known technique of controlling power to the unit.

The LEDs can stay lit in a solid pattern. Alternatively, the LEDs can be activated to flash in clusters. Alternatively, the LEDs can be operated to flash as strobe type lights.

Different colors of LEDs, such as but not limited to while, yellow, red, blue, green, combinations, thereof, and the like, can be used.

The LEDs can be used solely to draw visibility to the vehicle when on a job site or anywhere added visibility is required for safety.

A second variation of this device can be used to replace the factory third brake light/bed light with the added functionality of 2 high visibility yellow LED caution strobes that can be activated while the vehicle is in motion or parked on a job site.

The novel cap cover 1 can be used for various makes, models, and years trucks with several types of LED light configurations. The highly visible LED Lights can be set to multiple patterns.

The outer case forming the housing of the top 10, front 30 and rear 30 of the cap cover 1 can be made from durable ABS plastic and is designed to fit various makes, models, and years of pickup style trucks.

Other variations can be adapted to different styles of commercial vehicles such as step side trucks, Vans, Box, or straight trucks.

The novel LED cap cover 1 is designed specifically as a safety feature for commercial vehicles.

Although the locking doors are shown and described as being completely removable, the door(s) can be continuously attached by a hinge(s) or by sliding the door(s) on a track(s).

While the preferred embodiment shows and describes doors for the compartments, the invention can be practiced with only the lock preventing access to the fastener(s).

Although the preferred embodiment describes key locks, where a single key can access all the locks to the doors in the compartments, the invention can be used with different keys for each of the compartments.

While the locks are shown as being key locks, the invention can be used with other types of locks, such as but not limited to combination locks, and the like. The combination locks can have the same combination or different combinations.

Although the compartments are shown and described on top of the cap cover, the compartments can be in the side(s) of the cap cover, as well as on both the top and side(s) of the cap cover.

While each of the compartments are shown with a separate locking door, the invention can be used with one or two of the compartments having locking doors.

Although three compartments, each with a fastener are shown and described, the invention can be used with one, two or more than three compartments.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A light system for being attachable to vehicle tailgate, comprising:
   a cap sized to fit onto a top of a tailgate;
   a light on the cap;
   compartments in the cap having open ends;
   fasteners for attaching the cap to the tailgate, the fasteners being positioned in the compartments; and
   doors covering the open ends of the compartments; and
   at least one door lock for preventing access to at least one of the fasteners in the compartments, to prohibit removing the light system unless the at least one lock is unlocked.

2. The light system of claim 1, wherein the light includes:
   a light emitting diode (LED).

3. The light system of claim 2, wherein the LED is operated to continuously emit light therefrom.

4. The light system of claim 2, wherein the LED is operated as a strobe light.

5. The light system of claim 2, further comprising:
   a key fob for activating the LED.

6. The light system of claim 1, wherein the light is powered by an existing 12 volt battery power supply for the vehicle.

7. The light system of claim 1, wherein the compartments include three compartments, each with at least one of the fasteners.

8. The light system of claim 1, wherein the doors include:
   three doors, each used with the compartments so that the at least one lock is used for preventing access to at least one of the compartments with the at least one fastener.

9. The light system of claim 1, wherein at least one compartment is located on a front side of the cap.

10. The light system of claim 1, wherein the at least one lock is selected from at least one of: a key lock and a combination lock.

11. The light system of claim 1, wherein the at least one lock includes at least two locks that are opened with a same key or same combination.

12. The light system of claim 1, wherein the at least one lock includes at least two locks that are opened with a different key or different combinations.

13. The light system of claim 1, wherein the at least one compartment with the lock includes a cup shaped bottom for allowing each fastener to pass therethrough, and each compartment having a step ledge adjacent to the open end for allowing each door to sit therein so that a top of each door is flush with the cap.

14. The light system of claim 1, wherein the lock includes a pivoting lock tab that rotates between a lock position and an unlock position.

15. The light system of claim 14, wherein the at least one compartment with the lock includes a side slit for allowing the pivoting tab to rotate into the lock position when the locked is locked, and rotate to the unlock position with the pivoting tab out of the side slit.

16. A light system for being attachable to a vehicle tailgate, comprising:
   a cap sized to fit onto the vehicle tailgate;
   a light on the cap;
   a compartment in the cap having an open end;
   a fastener for attaching the cap to the vehicle tailgate, the fastener positioned in the compartment;
   a door covering the open end of the compartment; and
   a lock for locking the removable door to the open end of the compartment, the lock for preventing access to the fastener in the compartment, so as to prohibit removing the light system unless the lock is unlocked.

17. The light system of claim 16, wherein the compartment includes a cup shaped bottom for allowing the fastener to pass therethrough, and the compartment having a step ledge adjacent to the open end for allowing the door to sit therein so that a top of the door is flush with the cap.

18. The light system of claim 16, wherein the lock includes a pivoting lock tab that rotates between a lock position and an unlock position, and
   wherein the compartment includes a side slit for allowing the pivoting tab to rotate into the lock position when each locked is locked, and rotate to the unlock position with the pivoting tab out of the side slit.

19. A method of preventing a light from being removed from a vehicle tailgate, comprising the steps of:
   providing a cap to fit onto the vehicle tailgate;
   providing a light on the cap;
   providing a compartment in the cap, having an open end;
   attaching the cap to the vehicle tailgate with a fastener that is positioned in the compartment;

covering the upper open end of the compartment with a door;

locking the door to the open end of the compartment to prevent access to the fastener in the compartment, so as to prohibit removing the light system unless the lock is unlocked.

\* \* \* \* \*